United States Patent [19]

Lange

[11] 4,131,835

[45] Dec. 26, 1978

[54] MICROPROGRAMMABLE CONTROL UNIT

[75] Inventor: Heinrich Lange, Neubaldham, Germany

[73] Assignee: Siemens Aktiengesellschaft, Berlin & Munich, Germany

[21] Appl. No.: 797,341

[22] Filed: May 16, 1977

[30] Foreign Application Priority Data

May 21, 1976 [DE] Fed. Rep. of Germany ....... 2622974

[51] Int. Cl.² ...................... G05B 11/32; G05B 19/28
[52] U.S. Cl. .................................. 318/562; 318/600; 318/601; 318/602
[58] Field of Search ............... 318/603, 602, 601, 600, 318/569, 562

[56] References Cited

U.S. PATENT DOCUMENTS

| | | | |
|---|---|---|---|
| 3,906,324 | 9/1975 | Smith | 318/603 X |
| 4,059,746 | 11/1977 | Haga | 318/603 X |

*Primary Examiner*—B. Dobeck

*Attorney, Agent, or Firm*—Hill, Gross, Simpson, Van Santen, Steadman, Chiara & Simpson

[57] ABSTRACT

A microprogrammable control unit has a microprogram which comprises a plurality of command words and which is stored in a memory. The addresses of the command words are stored in an address register which is connected to the memory. The control unit also includes means, comprising decoders, for producing control signals for controlling a switching unit and multiplexers for interrogating conditions of the switching unit. A control stage is supplied with command words to switch through a plurality of binary characters of a command word to the decoders when a given first binary character in a command word has a first binary value and which switches through a plurality of binary characters of the command word to selector inputs of the multiplexers when the given first binary character has a second binary value, and which switches through the command word as an address to the address register when a given second binary character in the preceding command word has a predetermined binary value.

11 Claims, 3 Drawing Figures

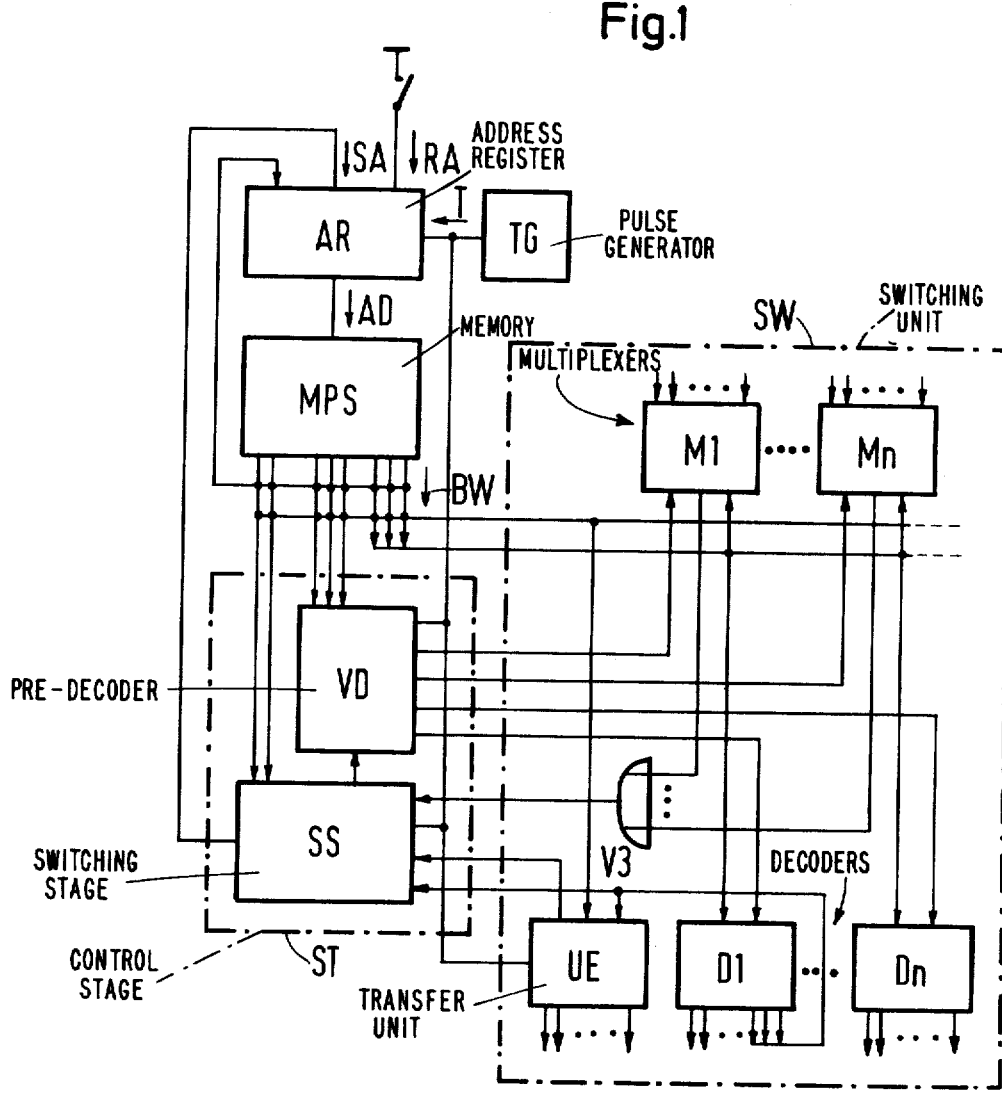
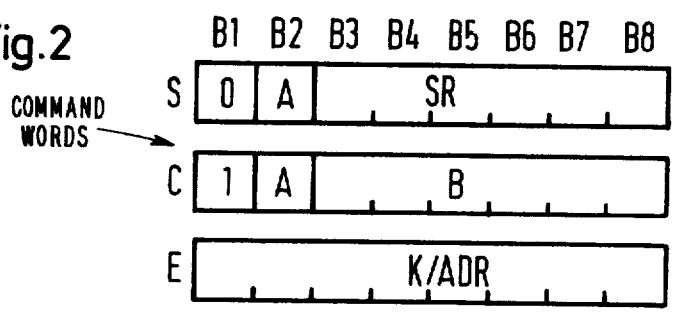

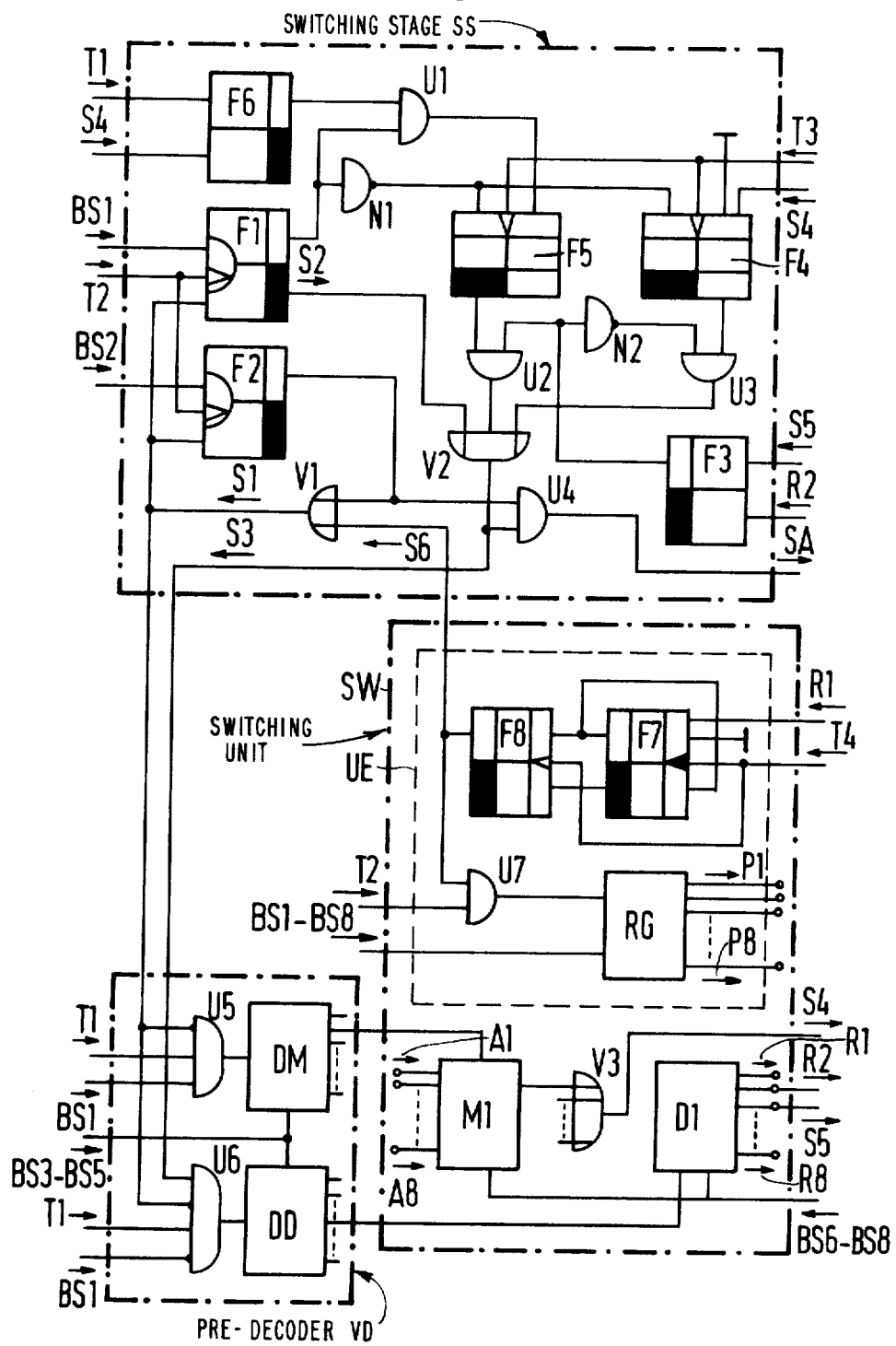

MICROPROGRAMMABLE CONTROL UNIT

BACKGROUND OF THE INVENTION

Field of the Invention

The present invention relates to a microprogrammable control unit in which a microprogram is stored in a memory and comprises a plurality of command words, in which the addresses of the command words are stored in an address register connected to the memory, and in which control signals for a switching unit which is to be controlled are produced by means of decoders connected to the memory, and in which conditions in the switching unit can be interrogated by means of multiplexers.

Description of the Prior Art

It is already generally well known in the art to execute control functions in switching units with the aid of microprocessors. Microprocessors of this type represent relatively efficient control computers which are accommodated in one or more than one integrated module. However, because of the technology employed, generally MOS technology, such microprocessors have long command times, and consequently are unsuitable for control functions in which a short command sequence time is required.

An analysis of the functions to be assumed by a microprogram-controlled switching unit indicates that it is not necessary in every case for the switching unit to execute arithmetic functions, such as, for example, addition or subtraction, as facilitated by currently available microprocessors with the aid of a widely fanned set of commands. However, in most cases it is not possible to eliminate the interrogation of variable states in the switching unit which is to be controlled and it is not possible to eliminate a change in the states of the controlled switching unit in dependence upon interrogated conditions. Furthermore, logical links of the interrogated conditions may also be necessary.

SUMMARY OF THE INVENTION

It is therefore the object of the present invention to provide a microprogrammable control unit with which the above-mentioned functions can be executed and which has a shorter cycle time than microprocessors.

According to the invention, the above object is realized in a microprogrammable control unit of the type generally mentioned above, in that a control stage is provided which is fed with the command words and which, in each case, switches through a plurality of binary characters of a command word to a plurality of decoders when, in the command word, a given first binary character has a first binary value; which in each case switches through a plurality of binary characters of the command word to selector imputs of a plurality of multiplexers for interrogating the controlled switching unit when the given first binary character has a second binary value; and which switches through the command word as an address to an address register when a given second binary character in the preceding command word has a predetermined binary value.

The microprogrammable control unit, according to the present invention, has the advantage, in comparison to known microprocessors, that it possesses a particularly simple structure and has universal connecting capabilities to the switching unit which is to be controlled. The control unit can be produced at a favorable cost in the form of integrated modules. The elements of the microprogram are commands of a very simple structure. In this manner, the programming of the control unit becomes very simple. For example, extensive control functions can be carried out by a plurality of microprogrammed control units which operate largely independently of each other and which are controlled by a further microprogrammed control unit or, for example, a microprocessor which assumes the superordinate control of the entire function flow. Therefore, the control units operate in an hierarchal manner in which the high-speed control units, with their limited range of effectiveness, are used only where they are absolutely necessary. The other functions, and in particular the coordination, are carried out by the slow, superordinate control unit. In this manner, favorable costs are achieved with respect to the overall control system.

If it is not a question of producing individual control signals, but a plurality of control signals simultaneously in the switching unit, or if additional counters or registers in the switching unit are to be loaded, it is advantageous to design the control stage in such a manner that it switches through a command word, as a constant, to the switching unit when, in the previous command word, the preceding first binary character has the first binary value and a plurality of binary characters have predetermined binary values.

If a plurality of constants is to be switched through to the switching unit, it is advantageous for the control stage to be designed in such a manner that it transmits a plurality of command words representing the constants, following release by a previous command word, consecutively in time to the switching unit.

In order that logical links of interrogated conditions can also be executed with the aid of the microprogrammable control unit, it is advantageous if the control stage contains switching elements with which it is possible to execute logical links resulting from the succession in time of a plurality of command words.

An OR linkage of the interrogated conditions is carried out when the control stage contains a first flip-flop which is set whenever at least one of the plurality of consecutively interrogated conditions is fulfilled and which is reset when a command word follows which does not trigger an interrogation of conditions.

An AND linkage of the interrogated conditions is carried out when the control stage contains a second flip-flop which is set when at least one of a plurality of consecutively interrogated conditions is not fulfilled and which is reset when a command word follows which does not trigger an interrogation of conditions. It is advantageous to provide a further flip-flop as a drive mechanism for the second flip-flop which is, in each case, set at the beginning of the command with which conditions are interrogated and which is reset whenever the condition was fulfilled and which, at a later time of the command, if it has not yet been reset by this time, sets the second flip-flop.

A switch-over between an OR linkage and an AND linkage is expediently carried out in that another flip-flop is provided which is set and rest by command words transmitted to the decoders, and which triggers an OR linkage and an AND linkage when it is set and reset, respectively.

Inasmuch as the command words change their significance, depending upon preceding command words, it is advantageous for the control stage to contain storage elements which are supplied with the first and second given binary characters of the command word, and which, in each case, store the first and second given binary characters of the particular preceding command word.

The expense in providing decoders in the switching unit is reduced if in a pre-decoder the control stage contains an additional decoder which is, in each case, supplied with given binary characters of the command word, and which emits selector pulses to the decoders in the switching unit.

In a similar manner, the expense in providing multiplexers is considerably reduced if, in a pre-decoder, the control stage contains a further decoder which is in each case supplied with the given binary characters of the command word, and which emits selector pulses to the selector inputs of the multiplexers in the switching unit.

BRIEF DESCRIPTION OF THE DRAWINGS

Other objects, features and advantages of the invention, its organization, construction and operation will be best understood from the following detailed description taken in conjunction with the accompanying drawings, on which:

FIG. 1 is a block circuit diagram of a microprogrammable control unit constructed in accordance with the invention;

FIG. 2 is a schematic illustration of command words which may be employed in the microprogrammable control unit of FIG. 1; and FIG. 3 is a logic circuit diagram of a control stage which may be employed in the microprogrammable control unit illustrated in FIG. 1.

DESCRIPTION OF THE PREFERRED EMBODIMENTS

The microprogrammable control unit illustrated in FIG. 1 comprises a pulse generator TG which produces timing pulses T of a given repetition frequency to an address register AR, to a control stage ST and to a switching unit SW which is to be controlled. The address register AR emits address words AD to a memory MPS which stores a microprogram composed of a plurality of command words. The microprogram comprises, for example, 256 command words, which in turn comprises, for example, 8 binary characters each and possibly further binary characters which serve for error safeguarding purposes. The command words BW which are read out from the memory MPS in dependence upon the address words AD are fed to the control stage ST, to the switching unit SW which is to be controlled, or to the address register AR.

The switching unit SW contains a plurality of multiplexers M1-Mn, whose outputs are combined by way of an OR gate V3. The multiplexers M1-Mn serve to interrogate states in the switching unit SW in order to carry out control processes in the switching unit SW in dependence thereon. For the execution of these control processes, the switching unit SW contains a plurality of decoders D1-Dn and possibly registers and/or counters which are arranged in a transfer unit UE.

The control stage ST contains a switching stage SS and a pre-decoder VD. The switching stage SS is supplied with two binary characters of the command word BW. These binary characters indicate whether the corresponding command word is a setting/resetting command, an interrogation command or whether the following command word is an address or a constant. Three binary characters of the command word BW are fed to the pre-decoder VD. With the aid of these binary characters, a pre-selection is made of the multiplexers M1-Mn and of the decoders D1-Dn in the switching unit SW. The remaining binary characters are fed directly to the multiplexers M1-Mn and to the decoders D1-Dn in the switching unit SW.

The command words illustrated in FIG. 2 are each composed of 8 binary characters B1-B8. Depending upon the two binary characters B1 and B2, three types of command words can be differentiated. A command word designated S serves, in the switching unit SW, to produce setting pulses or resetting pulses which, in turn, serve, for example, to set and reset a flip-flop, to increase a counter by one counting unit, or to load a register. In the case of a S-command of this type, the binary character B1 in each case has the binary value "0". When the binary character B2 has the binary value "1", the following command word is interpreted as an address for the address register AR, independently of the binary value of the binary character B1. In this manner, an unconditional shift command can be executed following a S-command. The binary characters B3-B8 which are collectively referenced SR contain the code for the selection of the control signal which is to be produced in the switching unit SW. The binary characters B3-B5 can here be fed, as indicated in FIG. 1, to the pre-decoder VD which, for example, selects 1-out-of-8 decoders and the binary characters B6-B8 can be directly fed to the decoders D1-Dn and indicate which of eight outputs is in each case to be activated. The selector lines extending from the pre-decoder VD to the decoders can have a dual function, namely to select the decoder and to transfer a pulse which is emitted for a short period of time at the particular selected output of the decoder.

The command word C serves to interrogate states or conditions in the switching unit SW. In this case, the binary character B1 has the binary value "1". The binary characters B2 has the same significance as in the case of the S-command. The binary characters B3 to B8 contain the coding for the selection of the signal which is to be interrogated in the switching unit SW. Similarly to the case of the S-command, the binary characters B3 to B5 can be fed to the pre-decoder VD which, for example, selects 1-out-of-8 multiplexers in the switching unit SW. The binary characters B6-B8 are then in each case directly fed to the multiplexers M1-Mn and in each case an input of a multiplexer is selected for the interrogation of a signal. When the interrogated signal has a given binary value, for example the binary value "0", the interrogated condition is to be considered as defined as "non-fulfilled". This results in the fact that the function assigned to this command is not executed with the next command word. When this condition is "fulfilled", i.e. when the selected signal has the binary value "1", the function assigned to the next command word becomes effective.

When two or more C-commands follow one another, the individual conditions are connected by AND links or OR links. The condition which is effective in the following operations is then the result of the logical linking of the sub-conditions. After a C-command or a S-command, the contents of the address register AR is increased by one counting unit.

A command word E represents either an address for the address register AR or an eight-digit constant, depending upon the content of the preceding command word. Here, the binary characters B1-B8, designated K/ADR of the command word are available as an address or a constant.

If a transfer unit UE has been activated with the aid of a preceding S-command, the E-command is interpreted as a constant. Here, it is possible to transfer a plurality of constants directly consecutively to the switching unit SW. These command words can be used, for example, to preset a counter or can be input into a register.

If in a preceding S-command or C-command the binary character B2 which is provided with the designation A has the binary value "1", the command word which forms the E-command is interpreted as an address for the address register AR. Therefore, a microprogram jump is carried out as is required, for example, in a program branching. The input of the address into the address register, i.e. the program jump, takes place when the E-command is preceded by a S-command. In this manner, an unconditional program shift is carried out. In addition, a conditional program shift takes place when the E-command is preceded by a C-command and the interrogation condition was fulfilled. If one of these conditions is not fulfilled, the content of the address register is increased by one and no program jump takes place.

If, as already mentioned above, two or more C-commands follow one another in the microprogram, the results of the individual interrogated conditions are logically linked with one another. The result of the linkage following the last C-command comes effective in the following operations. The AND link and the OR link are provided as linking operations. The transfer between an AND link and an OR link is preset with the aid of a S-command. Links of this type between consecutive condition interrogations result in considerable savings of command words.

For the microprogrammable handling of special functions it is provided that the microprogram can be interrupted. The interruption is carried out in a simple manner by resetting the address register AR to a start address with the aid of a signal RA which is illustrated in FIG. 1 and which is produced, for example, by means of a push-button.

A more detailed discussion of the content of FIGS. 1 and 2 will be described in the following together with the circuit diagram of the control stage ST illustrated in FIG. 3.

Referring now to FIG. 3, the control stage ST as shown in FIG. 1 is represented by circuit diagrams of the switching stage SS and of the predecoder VD. FIG. 3 also illustrates portions of the switching unit SW. The switching stage SS contains flip-flops F1–F6, AND gates U1–U4, OR gates V1, V2 and inverters N1, N2.

The predecoder VD contains two AND gates U5 and U6, and two decoders DM and DD.

In the switching unit SW there is provided a plurality of decoders and multiplexers, as indicated in FIG. 1, and which are illustrated in FIG. 3 by only one decoder and one multiplexer M1. The outputs of all of the multiplexers are connected to the inputs of an OR gate V3. The switching unit SW also contains a transfer unit UE which is surrounded by a broken line and which includes two further flip-flops F7, F8, an AND gate U7 and, for example, a register RG which serves to receive a command word representing a constant. The components which form that part of the switching unit SW which is to be controlled, such as logical linking elements and/or flip-flops are not shown, but are well known to those versed in this art.

MODE OF OPERATION

The mode of operation of the control stage ST will be described in the following in association with the execution of the S-command, a C-command and an E-command.

S-Command Operation

When a command word BW assigned to a S-command is emitted from the memory MPS, the binary character B1 has the binary value "0". It will be assumed that the S-command is not to be followed by an E-command, and that therefore the binary character B2 likewise has the binary value "0". Signals BS1 and BS2 assigned to the binary characters B1 and B2 are present at the data inputs of the flip-flops F1 and F2 in FIG. 3. Clock pulses T2 are present at the pulse train inputs of the flip-flops F1 and F2. The clock pulses T2 belong to a sequence of timing pulses T1-T4 which are each displaced in phase by 90° relative to one another and form the timing pulses T emitted from the pulse generator (clock) TG in FIG. 1. On the occurrence of the clock pulse T2, the binary values "0" are input into the flip-flops F1 and F2. With a timing pulse T1, the address register AR has already been increased by one counting unit in order to prepare for the read-out of the next command word BW. It will be assumed that in the previous command word, the binary character B2 did not have the binary value "1". The signal emitted from the output of the flip-flop F2 therefore has the binary value "0" and the signal S1 emitted from the output of the OR gate V1 thus likewise has the binary value "0". It will be further assumed that no C-command preceded and a signal S2 emitted from the inverting output of the flip-flop F1 thus has the binary value "1". A signal S3 having the binary value "1" is emitted from the output of the OR gate V2. The signal S3, together with the inverted signal S1, the clock pulse T1 and the inverted signal BS1 are present at the input of an AND gate U6. On the occurrence of the clock pulse T1, all of the conditions are fulfilled at the input of the AND gate U6, and the decoder DD is released for the duration of the clock pulse T1. Signals BS3–BS5 assigned to the binary characters B3–B5 are present at further inputs of the decoder DD. Depending upon the binary values of these signals, an output of the decoder is released.

In the switching unit SW, the further decoders D1–Dn are connected to each output of the decoder DD. The selector inputs of these decoders D1–Dn are supplied with the signals BS6–BS8 assigned to the binary characters B6–B8, and in a decoder selected with the aid of the decoder DD, an output is selected in dependence upon the binary values of the signals BS6–BS8. At this output, a signal is emitted which consists of a plurality of signals R1–R8 and which, for example, sets or resets a flip-flop in the switching unit, which prepares a counter or a register to receive a constant, or in the switching stage SS switches over the flip-flop F3 (signal R2) in such a manner that a plurality of results of condition interrogations are logically linked with the aid of following C-commands in accordance with an AND link or an OR link.

C-Command

In the execution of a C-command, the signal BS1 has the binary value "1". With the condition that no E-command follows, the signal BS2 has the binary value "0". On the occurrence of the timing pulse T2, the binary value "1" is input into the flip-flop F1, and the binary value "0" is input into the flip-flop F2. With the clock pule T1 the address register AR has already been increased by one counting unit in order to prepare the read-out of the next command word. The signal S1 has the binary value "0" and on the occurrence of the clock pulse T1, the AND gate U5 emits a signal to the decoder DM in the predecoder VD. Depending upon the binary values of the signals BS3–BS5, an output of the decoder DM is activated and thus, in the switching unit SW, a multiplexer is selected to interrogate conditions in the switching unit SW. The selector imputs of the multiplexer are supplied with the signals BS6–BS8 which indicate the address of the signal which is to be interrogated from a plurality of signals A1–A8. The output of the multiplexer M1 is connected by way of an input of the OR gate V3 to the switching stage SS. The remaining inputs of the OR gate V3 are connected to the outputs of the further muliplexers in the switching unit SW.

If the interrogated condition is not fulfilled, and the signal S4 at the output of the OR gate V3 has the binary value "0", the flip-flop F6 which has been set with a clock pulse T1 is not reset and the flip-flop F5 is set with the clock pulse T3. The flip-flop F4 is not set. With the clock pulse T4, the next command word is read out from the memory MPS. This command word remains ineffective, however, for the remainder of the microprogram, as the signals S3 and SA are not activated.

If, however, the condition interrogated by the multiplexer was fulfilled, the flip-flop F6 is reset, the flip-flop F5 is not set, and the flip-flop F4 is set. Then, the command indicated by the next command word is executed, as the signal S3 is released by way of the AND gates U2 or U3 and the OR gate V2. If the binary character B2 had the binary value "1" in the command word, the flip-flop F2 is also set. Therefore, the signal SA is also released by way of the AND gate U4, and the following command word is interpreted as an address.

If a plurality of C-commands follow one another in the microprogram, the results of the individual interrogated conditions are logically linked with one another. If the conditions are to be AND linked, the flip-flop F3 is set with the aid of a S-command. In the event of an OR linkage, the flip-flop F3 is reset. If a C-command is followed by a further C-command, the flip-flop F1 has the binary value "0". It would be assumed that the C-commands were preceded by a S-command which has set the flip-flop F3 and which has preset an AND linkage of the interrogated conditions. The flip-flop F6 is set with the clock pulse T1 as with every C-command. If the interrogated condition is not fulfilled, the flip-flop F6 remains in the set condition and the flip-flop F5 is set with the clock pulses T3 and remains set until the clock pulse T3 of the next command word, which does not represent a C-command. This command consequently likewise remains ineffective.

Under the assumption that an OR linkage is to be carried out between the interrogated conditions, the signal at the output of the flip-flop F3 has the binary value "0". The signal at the output of the inverter N2 thus has the binary value "1" and the AND gate U3 is released. As soon as one of the interrogated conditions is fulfilled and the signal S4 has the binary value "1", the flip-flop F4 is set and remains set until the clock pulse T3 of the next command word, which does not represent a C-command. By way of the AND gate U3 and the OR gate V2, the signal S3 is emitted, for example, to the AND gate U6. The next S-command can thus be executed.

E-Command

If, in a command word which represents a S-command or a C-command, the binary character B2 has the binary value "1", the next command word is interpreted as an address, i.e. as an E-command. The binary characters of this command word represent an address for the next command word to be read out from the memory MPS.

On the occurrence of an E-command, the signal at the output of the flip-flop F2 has the binary value "1" and the AND gate U4 is released. In addition, the signal S1 resets the flip-flops F1 and F2 and blocks the AND gates U5 and U6. If the E-command was preceded by a S-command or a C-command, and the interrogated condition was fulfilled, the AND gate U4 emits a signal SA to the address register AR. The signal SA inputs the command word BW as an address for the next command word into the address register AR. Then, the flip-flops F4 and F5 are reset with a clock pulse T3.

If an E-command is to represent a constant for the switching unit SW, with the aid of a S-command at the output of the decoder D1 a signal R1 is produced which sets the flip-flop F7. The next clock pulse T4 sets the flip-flop F8. The flip-flop F8 emits a signal S6 from its output to the OR gate V1 which resets the flip-flops F1 and F2 and blocks the AND gates U5 and U6. The signal at the output of the flip-flop F2 has the binary value "0" and therefore no signal SA is fed to the address register AR. The signal S6 also releases the AND gate U7 and with the next clock pulse T2, which is assigned to the E-command, the signals BS1–BS8 assigned to the binary characters B1–B8 of the command word are input into the register RG. Therefore, signals P1–P8 are emitted at the output of the register, and are available for further control functions in the switching unit SW. Instead of the register RG it is also possible to provide a counter which is preset by the signals BS1–BS8 and which counts up to a given count with the aid of the clock pulses. Time delays in the switching unit SW can be achieved, for example, with the aid of a counter of this type. The flip-flop F7 is reset during the S-command with the trailing edge of the clock pulse T4. With the leading edge of the clock pulse T4 during the E-command, the flip-flop F8 is reset, as is the signal S6. In this manner, the transfer signal for the register RG is blocked.

If a plurality of constants are to be transmitted to the switching unit SW, for example using a counter in the transfer unit UE, the signal S6 is maintained until all constants have been transmitted. With the aid of this counter and a subsequently connected decoder, a plurality of transfer signal is also produced, with which the constants are distributed among various registers and/or counters.

Although I have desribed my invention by reference to a particular illustrative embodiment thereof, many changes and modifications of the invention may become apparent to those skilled in the art without departing from the spirit and scope of the invention. I therefore intend to include within the patent warranted hereon all such changess and modifications as may reasonably and properly be included within the scope of my contribution to the art.

I claim:

1. A microprogrammable control unit for controlling a switching unit comprising:
   a memory storing a microprogram of a plurality of command words, each of said command words including a predetermined number of binary characters;
   an address register connected to said memory and storing the addresses of the command words;
   a plurality of decoders for producing control signals for controlling the switching unit;
   a plurality of multiplexers for connection to and interrogating conditions of the switching unit; and
   a control stage connected to said memory for receiving command words, said control stage connected to said address register to said decoders and to said multiplexers, said control stage including means operable to switch through a plurality of binary characters of a command word to said decoders in response to a given first binary character of the command word having a first binary value, means operable to switch through said plurality of binary characters of the command word to said multiplexers in response to said given first binary character having a second binary value, and means operable to switch through the command word to said address register in response to a given second binary character of the preceding command word having a predetermined binary value.

2. The control unit of claim 1, wherein:
   said control stage comprises means for switching through a command word, as a constant, to the switching unit in response to the first binary character of the preceding command word having said first binary value and a plurality of other binary characters of the word have stipulated binary values.

3. The control unit of claim 1, wherein:
   said control stage comprises means for transferring a plurality of command words, representing constants, in response to release by a preceding command word, consecutively in time to the switching unit.

4. The control unit of claim 1, wherein:
   said control stage comprises a plurality of switching elements for providing logical linkages from a sequence of a plurality of command words.

5. The control unit of claim 4, wherein:
   said plurality of switching elements comprises a first flip-flop which is set in response to the occurrence of at least one of a plurality of interrogation conditions and is reset in response to a following command word which does not trigger an interrogation of conditions of the switching unit.

6. The control unit of claim 4, wherein:
   said plurality of switching elements comprises a second flip-flop which is set when at least one of a plurality of consecutively interrogated conditions is not fulfilled and reset when a command word does not trigger an interrogation of conditions of the switching unit.

7. The control unit of claim 6, wherein:
   said plurality of switching elements comprises a further flip-flop connected ahead of said second flip-flop, said further flip-flop set at the beginning of each command word which triggers interrogations, and which is reset when the interrogation is fulfilled, and which sets said second flip-flop later during the command word if said further flip-flop has not been reset after a predetermined interval.

8. The control unit of claim 4, comprising:
   a third flip-flop connected to be set and reset by command words transmitted to said decoders; and
   OR linkage means and AND linkage means connected to and triggered by said third flip-flop when said third flip-flop is set and reset, respectively.

9. The control unit of claim 1, wherein:
   said control stage comprises storage elements for receiving the given first and second binary characters and which store the first and second binary characters of the previous command word.

10. The control unit of claim 1, wherein:
    said control stage comprises a pre-decoder which includes a further decoder which receives and decodes certain ones of said binary characters of a command word and which emits selector pulses to the first-mentioned decoders.

11. The control unit of claim 1, wherein:
    said control stage comprises a pre-decoder which includes a further decoder which receives and decodes certain ones of said binary characters of a command word and which emits selector pulses to said multiplexers.

* * * * *